United States Patent [19]

Sane et al.

[11] Patent Number: 4,600,481

[45] Date of Patent: Jul. 15, 1986

[54] ALUMINUM PRODUCTION CELL COMPONENTS

[75] Inventors: Ajit Y. Sane, Willoughby; Douglas J. Wheeler, Cleveland Heights, both of Ohio; Dan Gagescu, Petit-Lancy, Switzerland; Pierre E. Debely, Geneva, Switzerland; Iudita L. Adorian, Geneva, Switzerland; Jean-Pierre Derivaz, Geneva, Switzerland

[73] Assignee: Eltech Systems Corporation, Boca Raton, Fla.

[21] Appl. No.: 454,719

[22] Filed: Dec. 30, 1982

[51] Int. Cl.$^4$ .................. C25C 3/06; B29C 71/00; B05D 1/18

[52] U.S. Cl. .................. 204/67; 204/243 R; 204/279; 204/284; 204/291; 204/292; 501/96; 501/97; 501/98; 501/127; 428/469; 264/340; 264/349; 423/412; 427/431; 427/432; 427/443.2

[58] Field of Search ............... 204/243 R, 284, 290 R, 204/292, 293, 67, 279, 291; 423/412; 501/96, 98, 97, 127; 252/520, 518; 428/469; 264/340, 349; 427/431, 432, 443.2

[56] References Cited

U.S. PATENT DOCUMENTS

| | | | |
|---|---|---|---|
| 2,480,475 | 8/1948 | Johnson | 106/57 |
| 2,929,126 | 4/1956 | Bollack et al. | 423/412 |
| 3,011,982 | 12/1961 | Maduk et al. | 252/520 |
| 3,011,983 | 12/1961 | Ricker et al. | 252/520 |
| 3,108,887 | 10/1963 | Lenie et al. | 423/412 |
| 3,215,615 | 11/1965 | Ransley | 204/279 |
| 3,328,280 | 6/1967 | Richards et al. | 204/243 |
| 3,408,312 | 10/1968 | Richards et al. | 252/518 |
| 3,459,515 | 8/1969 | Bergmann | 29/182.8 |
| 3,544,486 | 12/1970 | Passmore | 252/520 |
| 3,661,436 | 5/1972 | Horvath et al. | 350/1 |
| 4,111,765 | 9/1978 | De Nora et al. | 204/67 |
| 4,206,263 | 6/1980 | Rieger et al. | 428/408 |
| 4,232,091 | 11/1980 | Grimshaw et al. | 428/472 |
| 4,243,621 | 1/1981 | Mori et al. | 264/65 |
| 4,277,539 | 7/1981 | Keller et al. | 428/450 |
| 4,297,421 | 10/1981 | Turillon et al. | 429/225 |
| 4,342,637 | 8/1982 | Withers et al. | 204/282 |
| 4,354,991 | 10/1982 | Suzuki et al. | 264/65 |
| 4,370,214 | 1/1983 | Kadija | 204/242 |

*Primary Examiner*—T. Tung
*Attorney, Agent, or Firm*—John J. Freer

[57] ABSTRACT

A component for an aluminum production cell comprising a refractory matrix having a rigid porous structure substantially filled with aluminum.

12 Claims, No Drawings

ALUMINUM PRODUCTION CELL COMPONENTS

TECHNICAL FIELD

This invention relates to the electrolytic production of aluminum from a fused bath, both by electrowinning and electrorefining processes, and in particular to components of aluminum production cells as well as to methods of producing these components.

BACKGROUND ART

Most aluminum is produced by the Hall-Heroult process which involves the electrolysis of alumina in a molten cryolite bath using carbon electrodes. The carbon anodes are consumed by the anodic oxidation process with the formation of $CO_2/CO$ and their life-time is very short, typically about 2 to 3 weeks for the prebaked type of anode. They also add impurities to the bath. The cathodes, which are also made of carbon but have a longer life-time of more than two years, are covered with a cathodic layer of molten aluminum which has to be maintained very thick in order not to expose the carbon to the bath because the carbon is not wettable by molten aluminum. This high inventory of aluminum in a cell leads to the drawback that the electromagnetic forces produce waves and ripples in the molten aluminum which necessitates a large interelectrode gap and a corresponding high cell voltage.

Many materials and design expedients have been suggested and tried with a view to improving the performance of electrolysis, but so far the results have not been successful. In particular, there have been numerous suggestions for aluminum-wettable cathode materials such as the refractory borides, but these materials are expensive, difficult to manufacture, and difficult to fix as a cell-lining material or to coat them on less expensive substrates. Various composite materials have also been suggested for this purpose (see for example U.S. Pat. Nos. 2,480,475, 3,328,280, 3,408,312, 3,459,515 and 3,661,436) but none of these materials have proven to be acceptable.

Recently, European patent application No. 82/200802.5, published on Feb. 16, 1983 under No. 0072043, has proposed composite materials of aluminum and an aluminum oxycompound, typically alumina, and optionally with additives such as borides, nitrides and carbides, which show great promise for those components of aluminum production cells which in use are normally covered with molten aluminum, including current-carrying components such as a cathode or cathode current feeder, part of a bipolar electrode, an anode current collector for an electrorefining cell, other electrically conducting components such as a cell-lining, and non-conductive cell components including separator walls, weirs and packing elements. These composite materials are formed by submitting particles of aluminum and the aluminum oxycompound and/or oxides which will form the aluminum oxycompound by reaction with the aluminum, and optionally with powders of the additives, to a heat treatment. Typically the particles are hot pressed or cold pressed and then heated. However, it is difficult by these methods to provide a highly dense structure and, furthermore, when a high aluminum content is desired to enhance the electrical conductivity it is difficult to obtain a stucture which remains rigid at the operating temperature (about 1000° C.). Conversely, where conductivity is desired and aluminum is the sole conductive agent, it has been found that the aluminum should account for about 15-40 vol % of the material.

DISCLOSURE OF INVENTION

The invention, as set out in the claims, provides an electrolytic aluminum production cell component comprising a preformed matrix based on at least one material from the group alumina, aluminum nitride, aluminum oxynitride, SiAlON, boron nitride, silicon carbide, silicon nitride and aluminum boride having voids extending throughout its structure, the voids in the preformed matrix structure being filled or substantially filled with aluminum in intimate contact with the matrix usually in wetting contact whereby the matrix will remain permanently filled with molten aluminum in the conditions of use of the cell component.

The invention also provides a method of making these cell components in which the preformed matrix is contacted with molten aluminum in conditions in which the matrix is wetted by the aluminum throughout its structure, it being understood that the matrix consists of or is based on materials such as alumina etc. which are normally non-wetted by molten aluminum if exposed to molten aluminum in the usual conditions of the cell environment (1000° C.). Therefore, in the art of electrolytic aluminum production, these matrix materials alumina etc. have become known for their property of non-wettability by molten aluminum, and reference in this text to "non-wettable" materials implies simply that the materials alone would be non-wetted by molten aluminum in the usual cell environment. However, in this invention, these matrix materials are made wettable by molten aluminum either by incorporating surface wetting agents or by exposure to molten aluminum under specific conditions of temperature, time of exposure and atmosphere, prior to incorporation in the cell or in some instances in the cell itself. It has been established that once the materials have been wetted by molten aluminum, the wetting contact is maintained even at lower temperatures and under an atmosphere in which wetting could not intially be established. By having the aluminum in wetting contact with the matrix, retention of the aluminum in the structure is assisted and a protective film of aluminum forms at the surface, protecting the structure from corrosion.

The matrix may be a self-sustaining foam or a porous sintered body having an intercommunicating pore system which may occupy 10-90% by volume, preferably in the range 25-90%. Foams would typically have a void volume of 60-90%. The pore dimensions of these structures would usually be in the range 1-2000 μ. Alternatively, the matrix may be a self-sustaining honeycomb having an ordered array of voids, typically a multichannel profile with square section openings although other shapes are possible. Often, the maximum transverse dimension of such openings or channels would be from about 100 μ to 5 mm. Another option is to provide the matrix in the form of a woven or felted fibrous mat, in which case it need not be a rigid structure.

The matrix may consist solely of one or more of the aforesaid non-wettable materials, alumina, etc. or it may incorporate, at least at the surface of its voids, at least one diboride of titanium, zirconium, hafnium or niobium which renders the matrix wettable by molten aluminum. Thus, the non-wettable matrix may be surface-coated by one of the diborides using suitable coating techniques, or the matrix may be a composite incorporating the diboride. In the latter case, to confer adequate wetting properties, the surface part will typically have a boride contents of 20–80 vol %, but inner parts of the matrix can have a lower boride concentration.

Advantageously, the matrix is contacted and filled with aluminum outside the cell, and the aluminum is allowed to solidify to fill the voids and encapsulate the matrix. Production of the components outside the cell has the advantage of eliminating any risk of cryolite penetration during production of the component. Furthermore, when the matrix includes AlN which is hygroscopic, ex situ production avoids any problem of moisture penetration which could occur during in situ production and would lead to powder formation and weakening of the structure. When a thus-produced component is introduced into the cell, the encapsulating aluminum simply melts and is incorporated in the cell environment.

In an alternative production technique, which is particularly suitable for matrices which are coated with or incorporate a wetting agent such as $TiB_2$, and for those matrices which do not include AlN, the matrix is contacted by and filled with molten aluminum in the aluminum production cell.

In the case where the matrix is a self-sustaining foam or a porous sintered body, it is convenient to fill up the pores with molten aluminum by infiltration, i.e. penetration of molten aluminum into the pores.

Infiltration can be achieved, for those matrices which are rendered wettable by molten aluminum by a wetting agent such as $TiB_2$ or nickel, simply by exposure to molten aluminum usually under an inert atmosphere such as argon. A temperature of 1000° C. will be sufficient for diboride-coated matrices; temperatures of 1200° C.–1500° C. have given good results with nickel coatings.

When the matrix is a porous body or foam of, for example, alumina without any surface agent assisting wettability, it is possible to penetrate the body with molten aluminum by first evacuating the pores and then applying molten aluminum with a sufficient pressure to overcome the capillary forces resisting penetration. This can be achieved by the application of pressure in an inert atmosphere, e.g. argon. When the matrix has been penetrated with molten aluminum in this way, the aluminum will remain in the matrix so long as the pores are not exposed to gas and a sufficient pressure is maintained on the aluminum covering the surfaces. Such components could thus be used at the bottom of an aluminum-covered cathode of a traditional Hall-Heroult aluminum production cell. However, a matrix filled in this way will usually be subjected to heat treatment, e.g. at 1400° C.–1800° C., for a sufficient time to establish a proper wetting contact of the aluminum in the matrix, thereby greatly enhancing retention of the aluminum in the matrix which enlarges the applications as cell component in which the material is useful. It has been established that the wetting of alumina matrices will be enhanced when the heat treatment is carried out in an atmosphere with an oxygen partial pressure less than about $10^{-6}$ mm Hg., e.g. either vacuum or argon in which the oxygen content is controlled.

If desired, the porous matrix with or without wetting agents can be infiltrated by vapor phase aluminum deposition to wet the surface with an aluminum film prior to filling the voids by infiltration with molten aluminum.

Generally speaking, the alumina and other matrices which are filled and wetted by the aluminum without the assistance of permanent wetting agents such as the diborides will be most useful in those applications in which they remain permanently covered with a protective layer of molten aluminum, and possibly also as components which do not usually contact the molten aluminum at all, e.g. conductor bars. For those matrices including a diboride as permanent wetting agent further applications are possible, e.g. where the surfaces are not permanently protected by an aluminum film but may be subjected to occasional contacts with molten cryolite.

In other procedure which is particularly suitable for but is not limited to honeycomb-type matrices, the voids of the matrix are filled with powdered aluminum, e.g. by packing aluminum powder into the voids of a honeycomb or by filling a foam with a slurry of aluminum powder, and the aluminum-filled matrix is then subjected to a suitable heat treatment to melt the aluminum and make it wet the matrix surfaces. This heat treatment will obviously depend on whether the matrix void surfaces are coated with or incorporate a wetting agent or are untreated.

One method of rendering the non-wettable matrix wettable by molten aluminum is to precoat the matrix throughout the surface of its voids with a wetting agent from the group lithium, magnesium, calcium, titanium, chromium, iron, cobalt, nickel, zirconium or hafnium and the diborides of titanium, zirconium, hafnium and niobium. It is understood that the diborides are relatively permanent wetting agents in view of their low solubility in molten aluminum, whereas the metallic agents will provide enhanced wettability at temperatures of 900° to 1100° C. but once wetting has been established, will dissolve in the molten aluminum.

Alternatively, a wettable matrix can be preformed by sintering materials to produce a porous composite of at least one of the matrix materials (alumina etc.) and at least one diboride of titanium, zirconium, hafnium and niobium and optionally aluminum. The accessible surface parts in the voids will usually have a boride concentration of 20–80 vol %, but inner parts can have a lower boride concentration. When the boride concentration in the matrix is uniform, for cost reasons it will preferably be kept below about 50 vol % of the matrix.

A composite matrix of this type advantageously includes aluminum compounds and diborides produced by reaction sintering. Very advantageously, the reaction takes place between finely divided aluminum and an oxide glass or microcrystalline gel of titanium, zirconium or hafnium oxide and boron oxide, e.g $TiO_2.B_2O_3$, formed by hydrolysis of organometallic compounds of the metal and of boron followed by drying/gelling. Optionally carbon can be included in the reaction mixture, as well as inert materials such as alumina and preformed borides. These reaction sintering processes provide an extremely finely divided boride in and on the surface of the matrix, and can be controlled to provide very pure products which are resistant to grain boundary attack by molten aluminum.

A major use of the described aluminum-filled matrix materials is as components of electrolytic aluminum production cells which in use are normally contacted with (e.g covered with) molten aluminum, especially as electrically conductive current-carrying components in which the aluminum filling provides the major current-carrying path. Typical examples are electrowinning cathodes and cathode current feeders and electrorefining anode current feeders and cathode current feeders, as well as conductive packing elements which stabilize a cathodic pool of molten aluminum, as described in PCT published patent application No. WP-8102170. The materials are also suitable for current-carrying parts such as cathode current feeders bars which normally would only be in contact with molten aluminum or cryolite in case of breakdown. However, the materials are also suitable for non-current carrying cell components including separator walls, weirs for overflowing molten aluminum, packing elements and other structural components. It will be understood that these components will generally be fully resistant to the cell environment. However, in the event for example of accidental contact with molten cryolite, the materials based on alumina and aluminum may corrode but will be essentially non-contaminating to the bath.

The invention will be further illustrated by the following examples:

EXAMPLE I

Plates of Degussa "Al 25" alumina of approx. 99.5% purity and 20–30% open porosity (mean pore dimensions 5–20 μ) were infiltrated with aluminum as follows. The plates were optionally pretreated by heating at 900° C. for 10 minutes in air to burn off organic impurities; or by exposure to hot concentrated nitric acid for 10 minutes; or no pretreatment was made. The plates were immersed in a boiling saturated solution of nickel formate in distilled water for 30 minutes, dried under vacuum at room temperatures for 30 minutes, and this procedure was repeated several time. After the final drying, the plates were heated in an argon or argon/hydrogen atmosphere at 600° C. for 30 minutes and then 900° C. for 10 minutes. The entire coating procedure was repeated for some plates. The alumina plates thus threaded had throughout their porus structure a nickel loading ranging from 0.3 to 0.5% by weight of the alumina.

Four of the plates having a nickel loading of 0.3 to 0.4% were exposed to molten aluminum for 12 hours at 1200° C. under an argon atmosphere. After cooling, it was observed that the pores had been penetrated with aluminum. All of the plates had metallic conductivity.

Six further plates with a nickel loading of 0.5 to 0.9% were exposed to molten aluminum for 12 hours at 1500° C. under an argon atmosphere. After cooling, it was observed that aluminum had penetrated the structures and was visible in the pores. In five plates, the smaller pores were incompletely filled. In the sixth plate all the pores were filled. All of the plates had metallic conductivity.

EXAMPLE II

Cubes of Degussa "Al 25" alumina of approx. 99.5% purity and 20 to 30% open porosity were impregnated with nickel (loading 0.6 to 0.8%) and infiltrated with aluminum as in Example I but at an infiltration temperature of 1400° to 1500° C. during 12 to 72 hours. The resulting composites all exhibited metallic conductivity.

A disc of 8 mm diameter and 3 mm thick cut from one of the cubes was held at 1000° C. under argon for 120 hours. No coalescence of the aluminum was observed at the end of the experiment and the material still exhibited metallic conductivity.

As a modification of Examples I and II, the alumina can be precoated with small quantities of different agents promoting the wetting of alumina by molten aluminum or the precoating step can be omitted and the alumina infiltrated at temperatures of about 1700° to 1800° C.

EXAMPLE III $Al_2O_3$ foams with about 90 to 92% porosity and having a pore size of about 1200 micron were coated with Ti using a molten salt bath of alkali halides and $TiH_2$. The foams were placed in an $Al_2O_3$ crucible containing a mixture of 165.2 g NaCl, 203.6 g KCl, 15.6 g $CaCl_2$ and 15.6 g $TiH_2$. The alumina crucible containing the sample and the salt mixture was placed in a sealed Inconel (Trademark) cell. The assembly was evacuated and then purged wth purified argon. The cell was then heated to 1000° C. in a crucible furnace. After maintaining the cell at 1000° C. for 4 hours, it was furnace-cooled. During the entire period, flow of argon was maintained. The salt mixture adhering to the sample was removed by washing with water. As a result the entire foams were coated with Ti.

The titanium-coated foams were then placed in a packed bed of boron. The packed bed was placed in an Inconel cell and heated to 1000° C., left for 48 hours at 1000° C., and furnace-cooled. Excess boron was removed by washing with propanol. Consequently, $TiB_2$-coated $Al_2O_3$ foams were obtained.

Infiltration of the treated $Al_2O_3$ samples was achieved by exposing the samples to molten Al contained in an $Al_2O_3$ crucible. The infiltration was carried out under argon at 1000° C. for 10 hours. After cooling, the samples were completely infiltrated with Al and showed metallic conductivity. The composition was 10.8% alumina, 5% $TiB_2$ and 84.2% aluminum.

One of the infiltrated foams was used for a drained cathode test. The foam along with the excess aluminum adhering to the foam was placed on top of a $TiB_2$ plate whcih was supported by a carbon platform. The design of the plate and the platform was such that aluminum electrowon at the cathode could be drained form the bottom. An Inconel rod in a boron nitride sheath provided the connection to the cathode. The assembly was placed in an $Al_2O_3$ crucible. The height of the foam was about 3 cm with a cross section of $2\times2$ cm. The thickness of the $TiB_2$ was about 2 mm, while that of the carbon platform was 7 mm. About 600 gm of electrolyte with a composition of $Na_3AlF_6$ 79.5%, $CaF_2$ 6.8%, $AlF_3$ 3.7%, $Al_2O_3$ 10.0% was added to the crucible. A carbon cylinder with a diameter of about 3.3 cm was used as anode. The assembly was placed in a sealed Inconel cell under continuous flow of argon and then heated to about 1000° C. When the cell reached the desired temperature, the anode was immersed and the cell was operated with a current of 4A. The gap between the anode and the cathode was calculated to be about 2.5 cm. The cell was operated under galvanostatic condition and the voltage was monitored. The time of electrolysis was 10 hours. The cell voltage was stable and in the range of 2.6 to 2.7 V. At the end of the test period, the power was shut off and the carbon anode was withdrawn from the melt and the assembly was furnace-cooled. After dismantling the set-up, it was found that about 7.2 g of the carbon had been consumed. The Al-infiltrated $Al_2O_3$ foam cathode was covered with aluminum and had no macroscopic damage. The wetting by Al was excellent. Excess aluminum was found at the bottom of the cathode, indicating the retention of Al in the foam even under electrolysis conditions and with the wettable substrate of $TiB_2$ at the bottom.

Another of the Al infiltrated foams was subjected to a solubility test in molten cyrolite containing 10% $Al_2O_3$ at 1000° C. for 100 hours. The cryolite was found to penetrate the walls of the foam but the foam remained intact and the infiltrated aluminum was retained. A reference specimen of alumina foam completely dissolved during the test.

EXAMPLE IV

A 6 mm long section of an extruded cylindrical alumina honeycomb body, external diameter 3 cm, having a multichannel profile with square openings of 1.5×1.5 mm and wall thickness 0.4 mm, was cleaned by ultrasounds in isopropyl alcohol and then heated in air at 500° C. for 2 hours. The recesses were filled with 99.9% pure aluminum particles of grain size <40 $\mu$ and this powder was compacted manually. The Al-filled body was then heated up to 1450° C. in a resistance heater under argon during 8 hours and held at 1450° C. for 2 hours. Cooling was carried out at the same rate.

After cooling, recesses in the tube were filled with aluminum which has been retained in the recesses and had excellently wetted the alumina surface. The aluminum provided metallic conductivity. Complete filling of the recesses corresponds to a 49.7% aluminum content in the composite structure.

As a variation of this Example, the alumina structure can be pretreated with a wetting agent such as $TiB_2$ or Ni. Another variation is to compact the Al powder ultrasonically and optionally place Al foils against the tube ends to provide Al-wet ends protected by aluminum.

EXAMPLE V

A solution was prepared using 339.9 g of titanium butoxide and 207.6 g of trimethyl borate. The solution was then allowed to hydrolyze in air saturated with water vapor at about 72° C. After hydrolysis, an oxide glass was obtained which was then subsequently heated to remove water and other volatiles.

40 g of the oxide glass powder was then mixed with 27.26 g of atomized aluminum (i.e. 3.2 g or 5% in excess of the amount of aluminum needed to reduce the oxides). After blending the powders, 1% (0.67 g) of polyvinyl alcohol, PVA, was added as binder and the powders were granulated, isopressed at 3500 kg/cm² and heated in argon at 1300° C. for 12 hours and then in nitrogen for 8 hours. The final body was a reticulated structure of $TiB_2/Al_2O_3$ in a 3:5 mol ratio (36:100 volume ratio) with small quantities of TiN and AlN; this structure had good electrical conductivity. The porosity was estimated to be 37% by volume of voids with a bi-modal pore distribution: small pores of dimensions 1-20 $\mu$ and large pores of dimensions 50-200 $\mu$. The $TiB_2$ was distributed as uniform grains 2$\mu$ dimension. The grain size of the alumina was predominantly 10-60$\mu$ with some fused grains of the order of 500-1000$\mu$.

The reticulated composite structure was then infiltrated with molten aluminum. The heating cycle and atmosphere was as follows: 25-700° C., 1.5 hours under vacuum; 700-1000° C., 1 hour under vacuum; 1000° C., 4 hours under vacuum followed by 12 hours under argon; 1000-25° C., 4 hours under argon. The body was completely infiltrated and its final composition was approximately 20.9% $TiB_2$, 52.1% $Al_2O_3$, 27% Al, traces of TiN and AlN, especially at the surface.

The aluminum infiltrated composite was tested as a cathode in molten cryolite containing 10% alumina at 1000° C. in a vertical cathode configuration, i.e. the cathode was not immersed under a pool of molten aluminum. The cathodic current density was 0.5 A/cm². The cathode showed good stability with retention of aluminum in the pores.

In a 100 hour solubility test in molten cryolite 10% alumina, there was no evidence of dimensional change whereas a specimen of alumina dissolved completely.

EXAMPLE VI

A homogenous $TiO_2.B_2O_3$ oxide glass powder was prepared as in Example V. A separate batch of the powder was mixed with carbon black an a Ti:B:C atom ratio of 1:2:5. A powder mix was then prepared by mixing 4.47 g of $TiO_2.B_2O_3$ powder, 4.73 g of atomised aluminum grain size approximately 6-9 u and 24.44 g of $TiO_2.B_2O_3+5C$ in a twin shell blender. About 2 g of Carbowax 200 (Union Carbide) dissolved in methylene chloride was added as a binder. After isopressing at 3500 kg/cm², the pellets were fired at 1300° C. for 14 hours in vacuum and then 23 hours in nitrogen. The pellets were lightly ground to a powder, repressed at 2820 kg/cm² and fired at 1500° C. in vacuum for 12 hours and in nitrogen for 4 hours. The resulting material was a reticulated structure of $TiB_2/AlN$ in a 1:1 mol ratio with a trace of TiC; the porosity corresponded to 20-30 volume % of voids.

The material was infiltrated with molten aluminum as follows: 25°-1000° C., 4 hours, vacuum; 1000° C., 4 hours, argn; 1000°-25° C., 4 hours, argon.

The aluminum-infiltrated composite was tested as a cathode in molten cryolite containing 10% alumina at 1000° C. both in a vertical cathode configuration and as a cathode current feeder immersed under a cathodic pool of molten aluminum. The material showed good stability and excellent wettability by aluminum.

EXAMPLE VII

A powder mix was prepared in the manner described in Example VI, except that 50% of the amount of Al needed for reduction was replaced by AlN (i.e. $TiO_2.B_2O_3$, 7.5 g; Al, 2.25 g; AlN, 5.12 g, $TiO_2.B_2O_3+5C$, 24.4 g; and Carbowax 200, 2.0 g in 10 cc methylene). By following essentially the same firing and infiltration schedule as in Example VI, a $TiB_2/AlN/Al$ composite was obtained. The corrosion test on the sample showed good stability of the sample in aluminum and cryolite and excellent wettablity by aluminum.

EXAMPLE VIII

Cubes of Degussit "Al 25" alumina of approx. 99.5 purity and 20 to 30% open porosity, measuring approx. 12×12×12 mm were each placed under a mass (about 100 g) of aluminum. A vacuum ($10^{-5}$ mm Hg.) was established and the temperature was raised to 1400° C. over 4 hours. The temperature was then maintained at 1400° C. for 1 hour under vacuum and for 1 hour under argon at atmospheric pressure. Heating was then discontinued and free cooling took place over several hours. The cubes were found to be fully infiltrated with aluminum, and protected over the surface by an aluminum film.

MODIFICATIONS

As modifications of the invention, it is possible to extend the concept to matrices based on Group IVb, Vb and VIb carbides, carbonitrides, boronitrides and borocarbides. Further, it is possible to form a diboride on the matrix in situ by aluminothermic reduction of a diboride precursor coated on the matrix. Wettability of the matrix by aluminum can also be achieved by including alloying elements such as lithium, magnesium, calcium, titanium, chromium, iron, cobalt, nickel, zirconium or hafnium in the aluminum or by the incorporation of a diboride component in the aluminum e.g. by the addition of a master alloy or double fluoride salt mixture containing e.g. Ti and B, as more fully disclosed in concurrently-filed UK Patent Application No. 82/36932.

In addition to the previously mentioned cell components, the aluminum-filled matrix materials are useful as cell container walls and/or floor.

We claim:

1. In a process of operating an electrolytic aluminum-production cell at temperatures in the vicinity of 1000° C. wherein a mass of molten aluminum within said cell functions as a part of the main current carrying circuit, the improvement which comprises employing as at least one of the cell components in contact with said molten aluminum a body comprised of a preformed self-sustaining refractory matrix having a rigid porous structure with open ordered or random intercommunicating voids extending throughout and composed predominantly of material from the group consisting of alumina, aluminum nitride, aluminum oxynitride, SiAlON, boron nitride, silicon carbide, silicon nitride, aluminum boride, and carbides, carbonitrides, boronitrides and borocarbides of Group IVb, Vb, and VIb metals, said voids having been filled or substantially filled with aluminum by intimately contacting said preformed matrix with molten aluminum under an inert atmosphere while maintaining temperatures of at least 1000° C. in the presence of an effective wetting agent for the interior surfaces of said voids of at least one diboride of titanium, zirconium, hafnium or niobium, for several hours, thereby assuring thorough wetting of the matrix surfaces within said voids by the molten aluminum, said matrix incorporating at least at the surface of its voids at least one diboride of titanium, zirconium, hafnium or niobium.

2. The process of claim 1, in which the matrix is a self-sustaining foam or a porous sintered body having an intercommunicating pore system.

3. The improvement of claim 1, in which the matrix is a self-sustaining honeycomb having an ordered array of voids.

4. The process of claim 1, wherein said matrix is a self-sustaining sintered body derived predominantly from alumina.

5. A method of producing a structural component for service in contact with molten aluminum in an electrolytic aluminum production cell operating at temperatures of about 1000° C. comprising:

preparing a rigid and self-sustaining preformed, porous refractory matrix of the size and shape desired, said matrix having intercommunicating voids extending throughout and composed predominantly of material from the group consisting of alumina, aluminum nitride, aluminum oxynitride, SiAlON, boron nitride, silicon carbides, silicon nitride, aluminum boride, and carbides, carbonitrides, boronitrides and borocarbides of Group IVb, Vb and VIb metals, and infiltrating said matrix with molten aluminum under an inert atmosphere while maintaining temperatures of at least 1400° C. in the absence of an effective wetting agent, or of at least 1000° C. in the presence of effective wetting agents until the voids in said matrix are thoroughly penetrated, wetted and substantially filled by the molten aluminum.

6. The method of claim 5 in which said infiltrating with molten aluminum is carried out outside the cell, and after said voids are substantially filled with molten aluminum, the aluminum is allowed to solidify and encapuslate the matrix.

7. The method of claim 5, in which the infiltrating with molten aluminum is carried out in situ in the cell.

8. The method of any one of claims 5, 6 or 7 in which, prior to said contacting, the matrix is precoated throughout the surface of the voids with at least one wetting agent from the group consisting of lithium, magnesium, calcium, titanium, chromium, iron, cobalt, nickel, zirconium, hafnium and the diborides of titanium, zirconium, hafnium and niobium.

9. The method of any one of claims 5, 6 or 7 in which the matrix is preformed by sintering raw materials to cause a reaction therebetween producing a porous composite of at least one of the matrix materials specified in claim 5 and at least one diboride of titanium, zirconium, hafnium or niobium.

10. The method of claim 9 in which said reaction produces an aluminum compound and a diboride as indicated.

11. The method of claim 5 wherein said preformed refractory matrix is a self-sustaining sintered body composed predominantly of alumina.

12. The method of claim 5, 10 or 11 wherein said inert atmosphere is principally argon.

* * * * *